(12) United States Patent
Leinen

(10) Patent No.: US 8,461,503 B2
(45) Date of Patent: *Jun. 11, 2013

(54) SENSOR AND ACTUATOR SYSTEM TO ESTABLISH LIGHT LEVEL SETPOINTS

(75) Inventor: Richard A. Leinen, Wilsonville, WA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 371 days.

This patent is subject to a terminal disclaimer.

(21) Appl. No.: 12/786,303

(22) Filed: May 24, 2010

(65) Prior Publication Data

US 2011/0284726 A1    Nov. 24, 2011

(51) Int. Cl.
*G01J 1/32* (2006.01)

(52) U.S. Cl.
USPC .......................................................... 250/205

(58) Field of Classification Search
USPC ............... 250/214 AL, 205, 214 R, 214 B, 250/214 D; 315/93, 129–136, 209 R, 291–297, 315/307, 312, 360
See application file for complete search history.

(56) References Cited

U.S. PATENT DOCUMENTS

| | | | | |
|---|---|---|---|---|
| 4,122,334 | A * | 10/1978 | Owens | ........................ 250/214 R |
| 6,466,826 | B1 | 10/2002 | Nishihira et al. | |
| 7,608,807 | B2 | 10/2009 | Hick et al. | |
| 2011/0284730 | A1 * | 11/2011 | Sturdevant | ................. 250/252.1 |

OTHER PUBLICATIONS

Leviton Mfg. Co., Inc. Lighting Management Systems, "OSFHU Lens Selection," Technical Article ID: 091708-tl-01, dated Sep. 17, 2008, 1 page.
Leviton Manufacturing Co., Inc., "Leviton Adds Increased Functionality to OSFHU High-Bay Occupancy Sensor," 2008, 1 page.
Leviton Manufacturing Co., Inc., "Remote Network miniZ Intelligent Daylight Management System," Product Specification, dated May 23, 2010, 2 pages.
The Watt Stopper, "HPCSIN Indoor Photocell Sensor Installation and Setup," Installation Instructions, 2001, 2 pages.
Maxim Integrated Products, "uP Supervisory Circuits with Windowed (Min/Max) Watchdog and Manual Reset," Product Specification, Dec. 2005, 12 pages.
The Watt Stopper, "HPCSKY Skylight Photocell Sensor Installation and Setup," Installation Instructions, 2001, 2 pages.
The Watt Stopper, "HPCSOT Outdoor Photocell Sensor Installation and Setup," Installation Instructions, 2001, 2 pages.
The Watt Stopper, "HPCU Photocell Controller Unit Installation and Setup," Installation Instructions, 2001, 4 pages.
The Watt Stopper, "Daylighting Control—Design and Application Guide," Jul. 2007, 21 pages.
Architectural Energy Corporation, "PIER Lighting Research Program—State of the Art Photocell Final Report," Feb. 26, 2003, 23 pages.
Precision Multiple Controls, Inc., "State-of-the-Art Electronic Photocontrols," dated May 23, 2010, 4 pages.

(Continued)

*Primary Examiner* — Que T Le
(74) *Attorney, Agent, or Firm* — Marger Johnson & McCollom PC

(57) ABSTRACT

A system may include a light sensor, an actuator having a range of motion, and a circuit adapted to establish a light level setpoint in response to the light sensor and the actuator. The circuit may be adapted to perform a first function when the actuator is in a first region of the range of motion and a second function when the actuator is in a second region of the range of motion.

39 Claims, 13 Drawing Sheets

OTHER PUBLICATIONS

Leviton Lighting Management Systems, "MiniZ User's Guide—Daylight Harvesting Made Simple," Apr. 2007, 26 pages.

Leviton Manufacturing Co., Inc., Lighting Management Systems Division, "Z-Max Quick Programming Guide," dated May 23, 2010, 37 pages.

Douglas Lighting Controls, "W-2000 Lighting Control Networks—Constant Light Control, Daylight Harvesting," dated May 23, 2010, 4 pages.

Leviton, "Photocell Installation Instructions," dated May 23, 2010, 2 pages.

Leviton Mfg. Co., Inc. Lighting Management Systems, "Dual Relay Multi-Technology Wall Switch Occupancy Sensors," Product Data, 2008, 6 pages.

Heath Co. LLC, "Motion Sensor Light Control," 2007, 4 pages.

Leviton Mfg. Co., Inc. Lighting Management Systems, "Photocells—Measures Light Levels to Automatically Adjust Light Levels to a User-Defined Level," 2009, 4 pages.

Opto Seminconductors, OSRAM, "High Accuracy Ambient Light Sensor," SFH 5711, Apr. 3, 2007, 9 pages.

Leviton Mfg. Co., Inc. Lighting Management Systems, "OSFHU Fixture-Mounted Infrared High-Bay Occupancy Sensor," 2009, 2 pages.

Intermatic, "Photo Controls," 2003, 4 pages.

Douglas, "Daylight Sensor—ON/OFF Control," Technical Data WPC-5621K, dated May 23, 2010, 2 pages.

Precision Multiple Controls, Inc., Specification for Model ESC-124DS, Photocell/Timer, dated May 23, 2010, 2 pages.

Leviton, "High Bay/Low Bay Passive Infrared Occupancy Sensor and Offset Adapter," Installation Instructions, dated May 23, 2010, 2 pages.

* cited by examiner

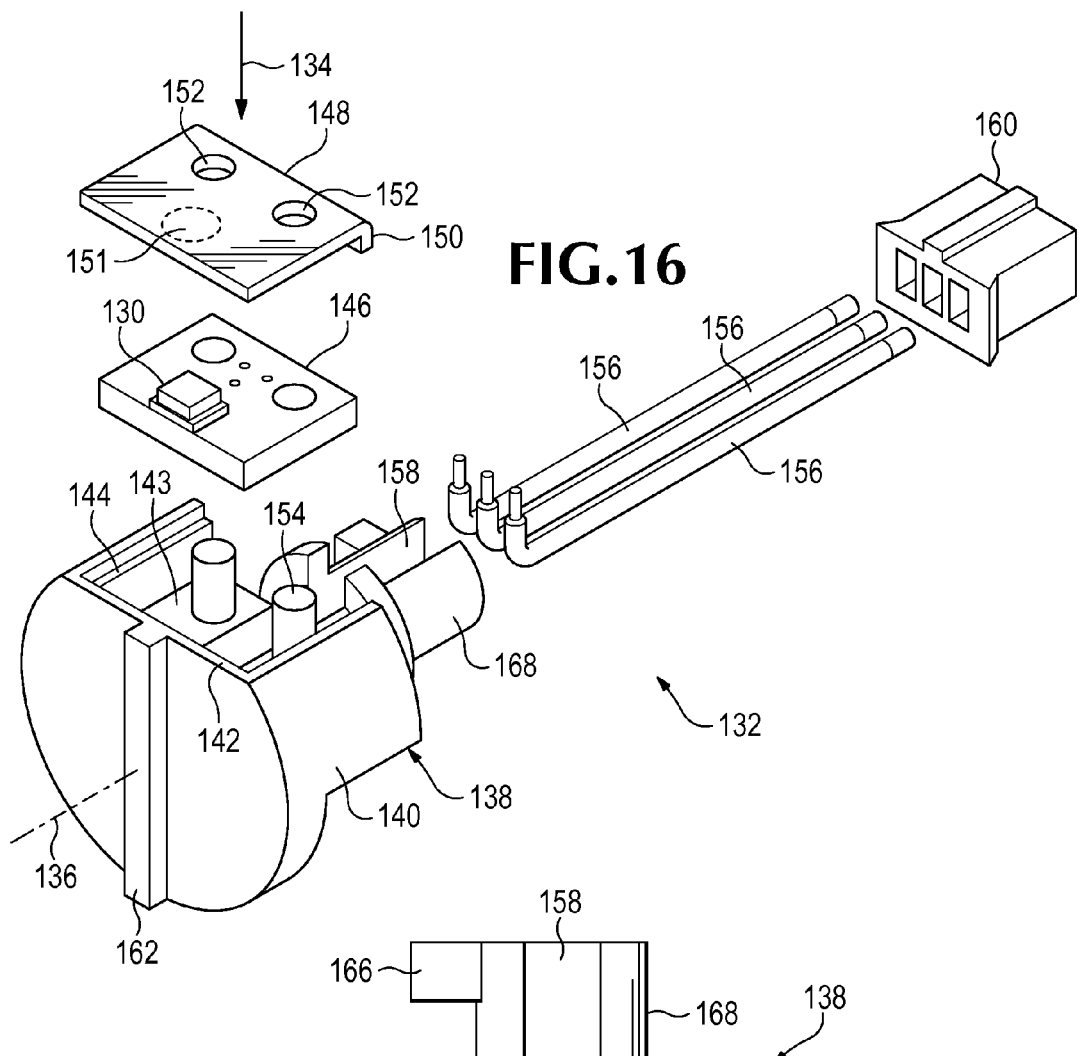
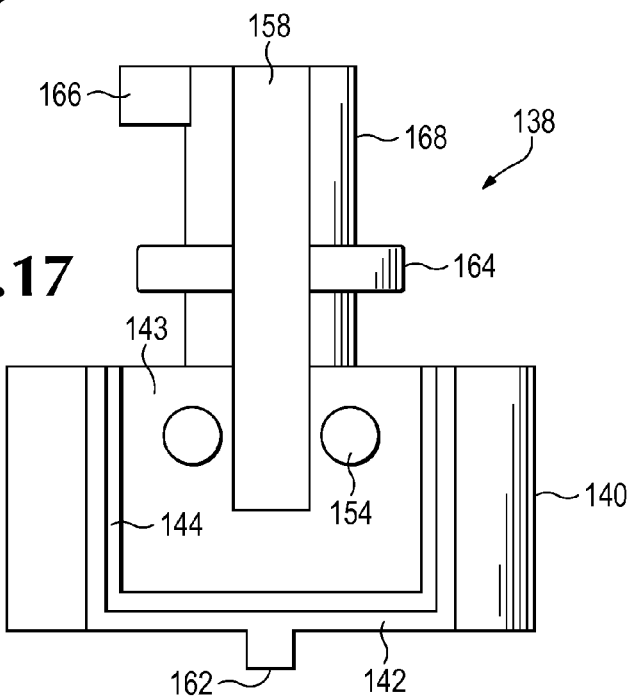

SENSOR AND ACTUATOR SYSTEM TO
ESTABLISH LIGHT LEVEL SETPOINTS

BACKGROUND

Lighting control systems often use daylight harvesting techniques to reduce energy consumption by dimming or turning off artificial lights when natural light is available. A typical daylight harvesting system includes a photocell or other light sensor to measure light in a specific building space. A control circuit adjusts the artificial lighting in an attempt to maintain the total light level at a predetermined setpoint. If the available light, as measured by the light sensor, is at or above the setpoint, no additional light is needed. If the available light falls below the setpoint, the control circuit attempts to turn on just enough artificial light to bring the combined total of natural and artificial light up to the setpoint level.

Daylight harvesting controls typically require a commissioning procedure to configure the controls and adjust various system parameters to operate properly and optimize efficiency. These controls may include inputs that select between open-loop and closed-loop operation, establish the setpoint level, initiate manual or automatic setpoint determination, provide a scaling factor for the signal level of the light sensor, set minimum and maximum output levels for the artificial lighting, and compensate for losses in light output as the sources of artificial light diminish over time. Each of these functions typically has an associated control device such as a switch or dial. For example, a typical daylight harvesting controller may have three or more blocks of DIP switches and several trimming potentiometers to adjust all of these parameters.

Photocells used in daylight harvesting systems typically have a cone-shaped field of view and are often implemented as remote components to facilitate placement in the best location for sensing ambient or task lighting. Some photocells are housed in fixed mountings that are designed to be attached to a building surface, conduit or electrical box. These fixed mountings are sometimes provided with shutters or movable mirrors to adjust the angle or field of view of the photocell. Other photocells are mounted in ball-and-socket assemblies or complicated swivel arms that enable the photocell to be aimed at a particular area of interest. Photocells are also included in lighting control assemblies with motion sensors. The field of view of the photocell and motion sensor are adjusted in unison by aiming the housing at an area of interest.

BRIEF DESCRIPTION OF THE DRAWINGS

FIG. 16 illustrates an example embodiment of a knob for a light level sensor according to some inventive principles of this patent disclosure.

FIG. 17 is another view of the knob body shown in FIG. 6.

DETAILED DESCRIPTION

Some of the inventive principles of this patent disclosure relate to the use of an actuator that can perform multiple functions relating to a light level setpoint in a lighting control system.

Figure 1:
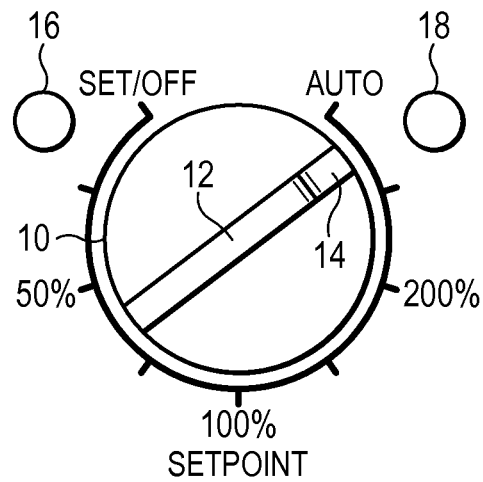
FIGS. 1 through 7 illustrate an example embodiment of a setpoint input device and operating methods according to some inventive principles of this patent disclosure.

FIGS. 1 through 7 illustrate an example embodiment of a setpoint input device and operating methods according to some inventive principles of this patent disclosure. Referring to FIG. 1, the input device is implemented with a rotary potentiometer, encoder or other device having an actuator knob or dial 58 with an angular range of motion that can be read by a control circuit. The actuator has a raised rib 60 to enable a user to turn the dial and a position pointer 62 to indicate the angular position of the dial.

The dial is surrounded by a face plate on a housing with markings to indicate various regions and positions the dial may be placed in. A SET/OFF region is essentially a position at the extreme clockwise end of the angular range, although the control circuit may be designed or programmed to recognize any position close to the end as being within the SET/OFF region so that mechanical backlash or component tolerances do not prevent the control circuit from recognizing when the actuator is in the SET/OFF position. An AUTO region is likewise essentially a position at the counterclockwise end of the range with similar accommodations for backlash, tolerances, etc.

An adjustment region takes up the remainder of the range between the SET/OFF and AUTO regions. The adjustment region includes calibrated markings for actuator positions at 25, 50, 75, 100, 150, 200 and 250 percent where the 100% position functions as a neutral or home position for certain operations as described in more detail below. The adjustment region may include a subregion, centered around the 100% position, so the actuator is recognized as being in the 100% position when it is anywhere in this region to accommodate backlash, tolerances, etc.

A SET/OFF indicator LED 64 is located near the SET/OFF position marking, and an AUTO indicator LED 66 is located near the AUTO position marking.

The control circuit may be designed, programmed, etc., to implement manual and/or automatic setpoint commissioning operations as follows.

The system is first configured with one or more photocells positioned in a suitable orientation. Typically, a photocell is arranged to face a source of exterior or natural light, such as a skylight, for open-loop operation. For closed-loop operation, a photocell is typically arranged to face a work surface or other area in the lighted space that receives both natural and artificial (electric) light. Manual calibration is typically used for open-loop operation, while automatic calibration is typically used for closed-loop operation, but the inventive principles are not limited to these typical practices.

Figure 2:
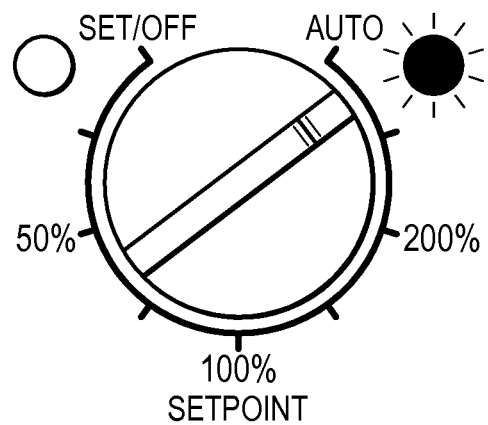

An automatic setpoint calibration operation begins when the dial is moved from the adjustment region into the AUTO position as shown in FIG. 1. If the dial remains in the AUTO position for a first period of time, e.g., 2 seconds, the AUTO LED begins to flash as shown in FIG. 2, and the system is placed in an automatic calibration mode. The SET/OFF LED is off in this mode. As an example, in the automatic calibration mode, all lights controlled by the control circuit may be forced to full output for a 24 hour period during which the control circuit continuously records the amount of light measured by the photocell. The AUTO LED continues to flash during the 24 hour period to indicate the system is in automatic calibration mode. At the expiration of the 24 hour period, the control circuit enters a normal operating mode in which the lowest measurement recorded during the 24 hour period is used as the setpoint (or design level). During normal operation, the AUTO LED remains illuminated without flashing to indicate that the current setpoint was acquired through the automatic calibration process. As long as the dial remains in the AUTO position, the control circuit uses the setpoint that was acquired through the automatic calibration process.

Figure 3:
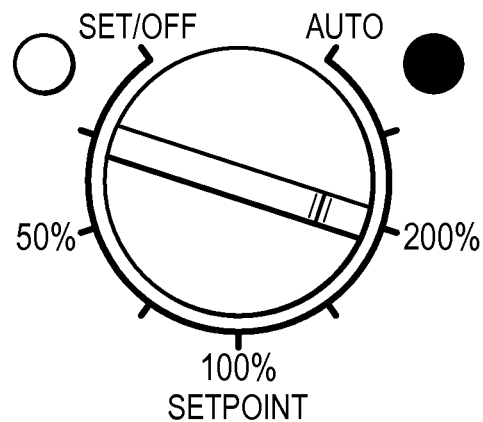

The setpoint that was acquired through the automatic calibration process may be adjusted by moving the dial into the adjustment region of operation. For example, if the dial is moved to the 200% position as shown in FIG. 3, the control circuit adjusts the setpoint to twice the value that was acquired through the automatic calibration process. If the dial is moved to the 50% position, the setpoint is adjusted to half the acquired in automatic mode. The AUTO LED remains illuminated without flashing while the dial is in the adjustment region to indicate that the control circuit is using the setpoint acquired in automatic mode, adjusted by the percentage indicated by the dial.

As an example of how the adjustment region may be used, a lighting designer may specify a design level based on a maintained output level from the installed light fixtures, which is typically lower than an initial output level because the light output tends to decrease over time as lamps age, fixtures collect dust, etc. If the automatic calibration process is performed right after the fixtures are installed, an unintentionally high setpoint may be obtained because the new fixtures and lamps provide an initial output level that is greater than the maintained output level. Thus, after the automatic calibration process, the dial may be moved to an appropriate position, e.g., between the 80 and 95 percent positions to adjust for the light loss factor anticipated by the lighting designer.

As another example, the light fixtures may have been installed with lamps having a lower light output than specified by the lighting designer, and therefore, the setpoint determined through the automatic calibration process may be too low. The dial may then be moved to a position within the adjustment region that is greater than 100 percent to compensate for the lower output lamps.

By providing a calibrated adjustment to the setpoint, a system according to the inventive principles may eliminate inaccuracies or guesswork associated with uncalibrated adjustment controls that merely indicate an "increased" or "decreased" setpoint without providing an accurate measure of the amount of adjustment.

At any time, the setpoint acquired in automatic mode as describe above, or through manual mode as described below, may be reestablished through the automatic calibration process by moving the dial into the adjustment region if it is still in the AUTO position, then back into the AUTO position. This starts or restarts the automatic calibration process as described above.

If during the automatic calibration process the dial is moved out of the AUTO position and into a percentage position in the adjustment region, the control circuit saves the light level sensed by the photocell at the moment the dial is moved out of the AUTO position, and multiplies this saved value by the percentage indicated by the dial as the setpoint (design level). The AUTO LED is illuminated without flashing to indicate that the control circuit is using the saved setpoint, adjusted by the percentage indicated by the dial. This method may allow access to the automatic calibration algorithm without having to wait the full 24 hour period, albeit, at the possible expense of accuracy depending on the circumstances. For example, if the dial is moved out of the AUTO position during a time at which no natural light is available, then the setpoint acquired through this method may be fully accurate.

Although the automatic calibration mode described above uses a 24 hour period, the inventive principles are not limited to a 24 hour calibration method, and any other suitable automatic calibration technique may be used.

Figure 4:
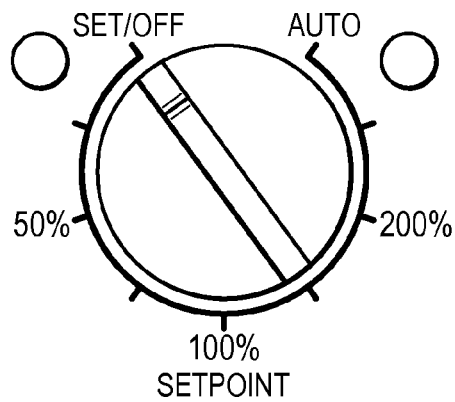
Figure 5:
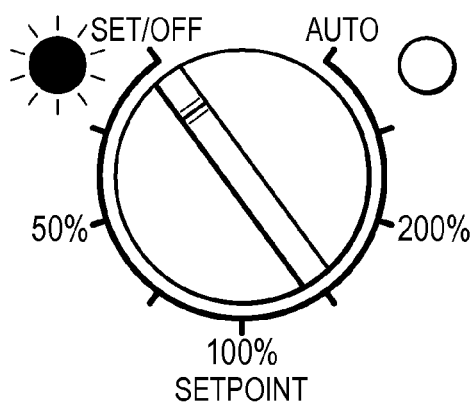
Figure 6:
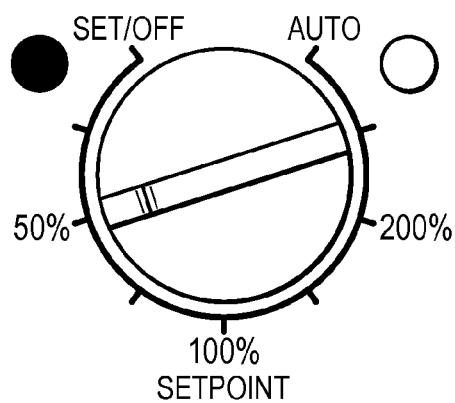

A manual setpoint calibration operation begins when the dial is moved from the adjustment region into the SET/OFF position as shown in FIG. 4. If the dial remains in the SET/OFF position longer than a second time period, e.g., 2 seconds, the SET/OFF LED begins to flash as shown in FIG. 5, and the system is placed in a manual calibration mode. The AUTO LED is off in this mode. Once the SET/OFF LED starts flashing, the dial is then moved out of the SET/OFF position and into the adjustment region. This instructs the control circuit to use the light level measure by the photocell at the moment manual mode was activated, multiplied by the percentage indicated by the dial, as the setpoint. For example, if the dial is moved to the 50% position as shown in FIG. 6, the control circuit uses half of the light level measure by the photocell at the moment manual mode was activated as the setpoint. Once the dial is moved out of the SET/OFF position, the SET/OFF LED is illuminated without flashing as shown in FIG. 6 to indicate that manual mode was used to determine the current setpoint.

Figure 7:
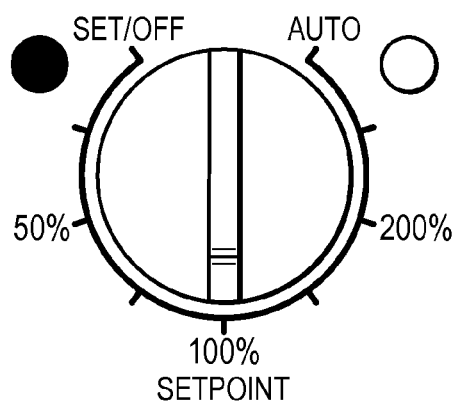

Although the light level measure by the photocell in manual mode may be locked in by moving the dial to any position within the adjustment region, additional functionality may be implemented if the dial is moved to a specific position within the adjustment region. For example, if the dial is moved directly to the 100% position as shown in FIG. 7, the control circuit may enter a special mode in which lights controlled with an on/off signal are switched with no delay time as the dial is moved back and forth past the 100% position. A daylight harvesting system typically implements a photocell delay time of anywhere from 30 seconds to 30 minutes to prevent repeated switching as the measured light level gradually crosses the setpoint. In the special mode, this delay time is eliminated so an installer can turn the lights on and off by turning the dial back and forth past the 100% position. This may enable easier and/or quicker level testing. The special mode may be enabled for any suitable time period, e.g., five minutes, after the dial is initially moved to the 100% position. In the special mode, a small amount of hysteresis may be included to prevent the on/off light control from flickering if the dial is placed very close to the setpoint position.

At any time, the setpoint acquired in any of the manual or automatic modes described above may be reestablished through the manual calibration process by moving the dial into the adjustment region if it is not there already, then back into the SET/OFF position. This starts or restarts the manual calibration process as described above.

A disable feature may also be implemented. For example, if the dial is moved from the adjustment region into the SET/OFF position and remains in the SET/OFF position longer than second time period, e.g., 2 seconds, the SET/OFF LED begins to flash, and the system is placed in a manual calibration mode. If, however, the dial is left in the SET/OFF position longer than a third time period, e.g., an additional 5 seconds, the lighting level control is disabled, and the SET/OFF LED is turned off as shown in FIG. 4.

An example of a manual calibration process is as follows. The photocell may be installed in an open-loop configuration, and a manual calibration process as described above may be initiated by placing the dial in the SET/OFF position. Once the SET/OFF LED starts flashing, the dial is turned immediately to the 100% position to lock in the setpoint based on the current light level measured by the photocell and invoke the special operating mode that enables switching the load in response to moving the dial back and forth past the 100% position with no time delay. The dial is then used to turn the lighting load off so the amount of natural daylight in the space may be measured. The measurement may be obtained using a light meter, the installer's judgment, or any other suitable technique. The measured light may then be used to adjust the setpoint using the calibrated percentages in the adjustment region of the dial. For example, if a light meter is used to determine that 40 foot candles of natural light is available when the lights are off, and the design level is known to be 50 foot candles, the dial may be turned to the 125% position to cause the control circuit to use the current light level measured by the photocell (40 fc) times 1.25 (125%) as the setpoint (50 fc).

The setpoint input device and operating methods described above with respect to FIGS. 1 through 7 may be used in conjunction with lighting loads having on/off control, dimming control, bi-level control, or any other suitable control techniques or combinations thereof.

When used in conjunction with on/off or other types of switched load control, the control circuit may be configured to use different trigger points depending on whether automatic or manual calibration mode was used to acquire the setpoint. For example, the control circuit may be designed to assume the system is configured for open-loop operation if a manual calibration mode is used as described above.

If the setpoint is acquired through the manual mode, the control circuit may implement the following trigger points and delay times. The off trigger point may be 10 percent above the setpoint, and lights may not be switched off until the light level measured by the photocell is above the off trigger point for five minutes. The on trigger point may be equal to the setpoint level, and the lights may not be switched on until the light level measured by the photocell is at or below the on trigger point for one minute.

Figure 8:
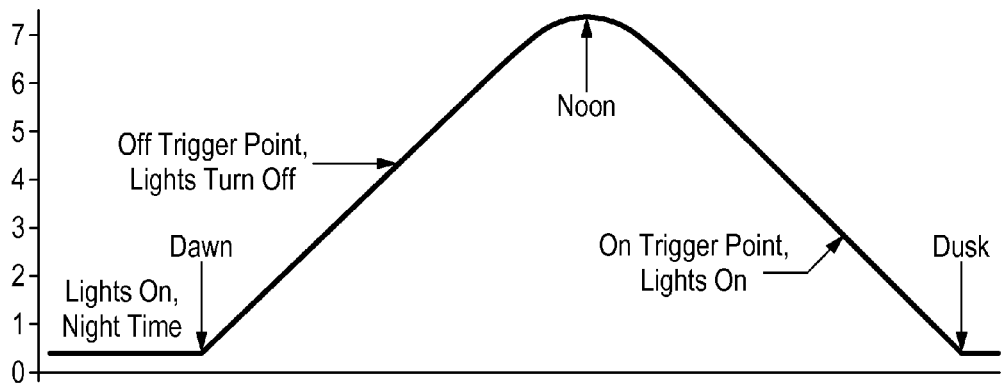
FIG. 8 illustrates how an example embodiment of trigger points may operate in an open-loop implementation according to some inventive principles of this patent disclosure.

FIG. 8 illustrates an example of how the trigger points described above may operate in an open loop implementation.

If the setpoint is acquired through an automatic calibration process as described above, the control circuit may implement the following trigger points and delay times for a system having only a single switchable lighting load. The off trigger point may be 2.5 times the setpoint, and lights may not switched off until the light level measured by the photocell is above the off trigger point for five minutes. The on trigger point may be equal to 1.25 times the setpoint level, and the lights may not be switched on until the light level measured by the photocell is at or below the on trigger point for one minute. If the setpoint acquired through the automatic calibration process does not provide adequate operation in a system that implements the trigger points specified above, the setpoint may be adjusted by changing the dial to an appropriate position in the adjustment region.

Figure 9:
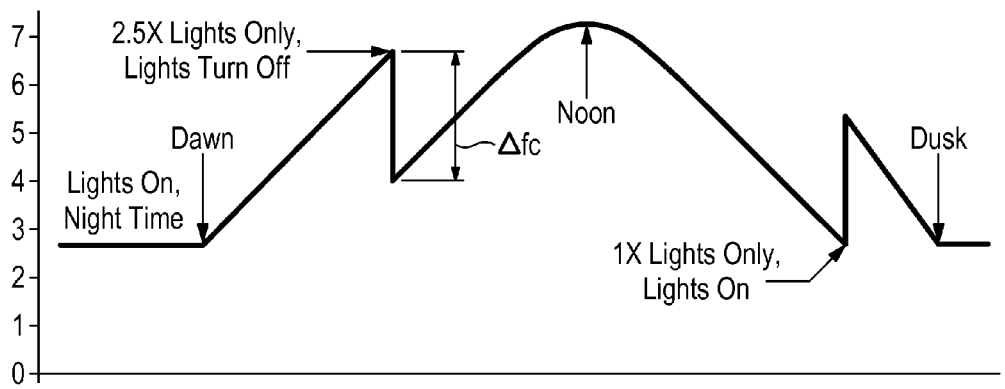
FIG. 9 illustrates how an example embodiment of trigger points may operate in a closed-loop implementation according to some inventive principles of this patent disclosure.

FIG. 9 illustrates an example of how the trigger points described above may operate in a closed-loop implementation.

In a system having two lighting loads that may be switched by the control circuit, the system may be configured so that only one load may be affected by daylight harvesting operations. For example, one of the lighting loads may be a background load that is left on regardless of the amount of natural light available (unless it is turned off by some other lighting control feature such as an occupancy sensor). The contribution of this background load may be taken into consideration so that a less abrupt change is made at the trigger points. That is, after the design level is determined during an automatic calibration process, the background load may be turned off and a second light level measurement may be taken while the background load is off. The contribution from the background load is equal to the design level minus the second light level measurement.

Once the light level from the background load is known, the trigger points may be set as follows. The off trigger point may be calculated by first multiplying the design level by 2.5 to generate an intermediate off result. The background light level may then be subtracted from the intermediate off result to generate the off trigger point. The lights may not switched off until the light level measured by the photocell is above the off trigger point for five minutes. The on trigger point may be calculated by first multiplying the design level by 1.25 to generate an intermediate result. The background light level may then be subtracted from the intermediate on result to generate the off trigger point. The lights may not be switched on until the light level measured by the photocell is at or below the on trigger point for one minute.

Figure 10:
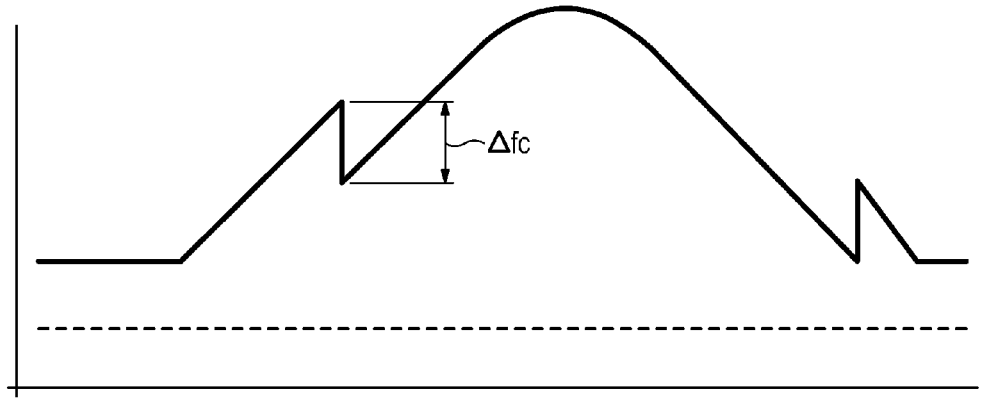
FIG. 10 illustrates how an example embodiment of trigger points may operate in a closed-loop implementation with dual switches according to some inventive principles of this patent disclosure.

This method is illustrated in FIG. 10 where the dashed line indicates the level of background light provided by the background lighting load. As is apparent from FIG. 10, the change in the light level Δfc is smaller in the embodiment of FIG. 10 than in the embodiment of FIG. 9. Thus, the change in light level in the building space may seem less abrupt.

If the setpoint acquired through the automatic calibration process, minus the background light level, does not provide adequate operation in a system that implements the trigger points specified above, the setpoint may be adjusted by changing the dial to an appropriate position in the adjustment region.

The inventive principles are not limited to the embodiments described above with respect to FIGS. 1 through 10. The inventive principles may be applied to any system in which an actuator may have any range of motion to cause a lighting control system to perform multiple functions relating a light level setpoint in a lighting control system. The range of motion may include two or more regions in which the actuator may be positioned. The actuator may cause a lighting control system to perform any first setpoint related function when the actuator is in the first region, and any second setpoint related function when the actuator is in the second region.

Examples of functions include setting a light level setpoint, adjusting the light level setpoint, initiating and/or cancelling a manual or automatic setpoint acquisition process, disabling the setpoint, selecting between open-loop and closed-loop operation, setting a scaling factor for a light level signal from a light level sensor, setting minimum and/or maximum lighting output levels, setting a light loss factor (LLF), setting a slow/fast response time for reacting to the light level sensor, etc.

The range of motion 10 may be a two-dimensional area in Cartesian coordinates X and Y, but the range may be realized in any number of dimensions in any coordinate system. For example, the range may be a one-dimensional linear range, a one-dimensional rotational (angular) range, a two-dimensional range in polar coordinates (angular and radial), etc.

The actuator may be realized in any suitable form such as a linear actuator on a linear potentiometer, encoder, switch, etc., a knob or dial on a rotating potentiometer, encoder, capacitor, switch, etc., a joystick, keypad, touchpad, etc.

The two or more regions may cover the entire range of motion, but there may be gaps between regions in the range, there may be more than two regions in which the same setpoint related function is performed, the system may perform more than one function when the actuator is within a single region, a region may be divided into subregions in which the lighting control system performs sub functions, etc.

A region or subregion within the range may include an amount of space in one or two dimensions, etc., or it may include a single position within the range. The setpoint related function or functions performed by a lighting control system may be dependent on the amount of time the actuator is in a certain region.

Figure 11:
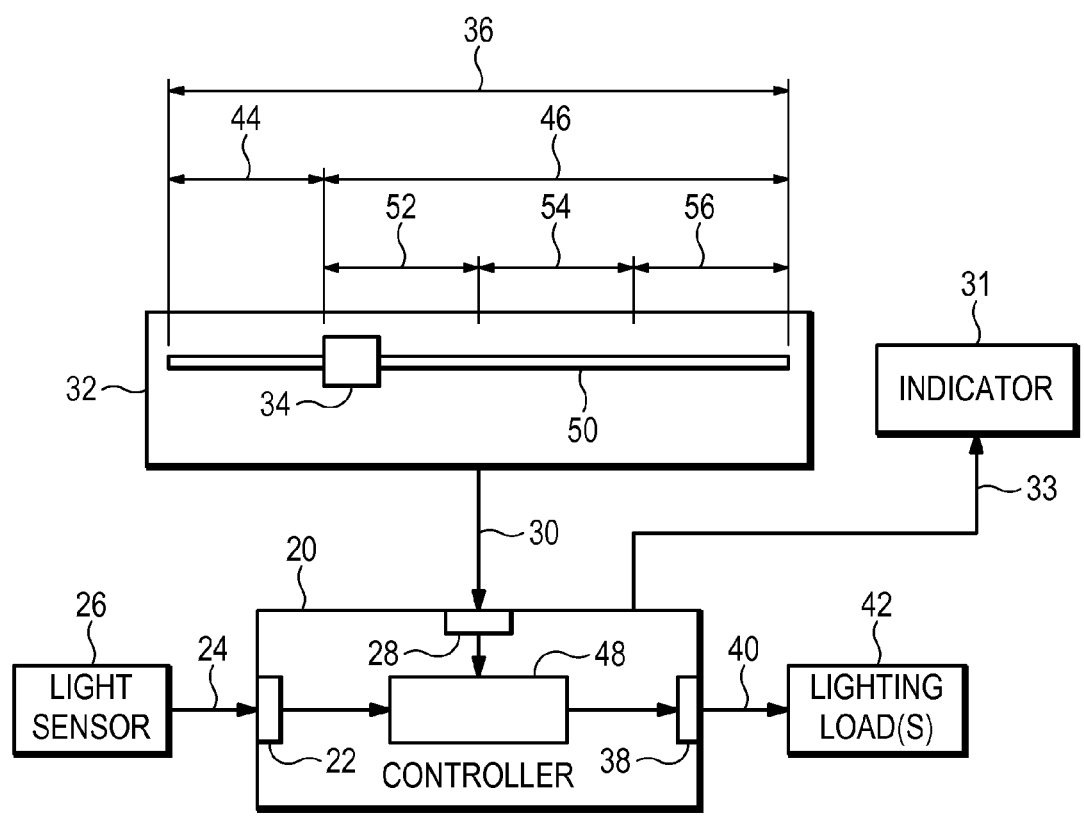
FIG. 11 illustrates another embodiment of a lighting control system having an actuator for multiple functions relating a light level setpoint according to some inventive principles of this patent disclosure.

FIG. 11 illustrates another embodiment of a lighting control system according to some inventive principles of this patent disclosure. The embodiment of FIG. 11 includes a controller 20 having a first input connection 22 to receive a light level signal 24 from a light sensor 26. The controller 20 also includes a second input connection 28 to receive an actuator signal 30 from an input device 32 having actuator 34 that can move through a range of motion 36. The controller 20 has an output connection 38 to transmit a lighting control signal 40 for controlling one or more lighting loads 42. One or more indicators such as LEDs, displays, etc., may be included to provide status or other outputs in response to one or more indicator signals 33.

The controller 20 includes a circuit 48 adapted to establish a light level setpoint in response to the light level signal and the actuator signal. The circuit is adapted to perform a first function relating to a light level setpoint when the actuator is in a first region 44 of the range of motion and a second function relating to a light level setpoint when the actuator is in a second region 46 of the range of motion.

In the embodiment of FIG. 11, the input device 32 is illustrated as a linear potentiometer or encoder having a linear actuator 34 that slides in a track 50, but any suitable input device and actuator may be used. Either of the regions 44 and 46 may be further divided into subregions such as 52, 54 and 56 that correspond to different functions or subfunctions that the control circuit may perform when the actuator is in one of these subregions.

The control circuit 48 and any other circuitry and/or logic in the system may be implemented with analog and/or digital hardware, software, firmware, etc., or any combination thereof. For example, the control circuit may be implemented with a microcontroller having an A/D converter to read the position of a linear or rotary potentiometer used for the input device 32, and to read the level of an analog light level signal from the light sensor 26. The microcontroller may provide digital outputs for on/off control of lighting loads and/or the microcontroller may have a D/A or PWM output to provide analog output signals to control dimmable lighting loads. Alternatively, all inputs and outputs may be through a digital control network such as CAN, Modbus, LonWorks, etc.

The controller 20 may be dedicated to providing light level control, e.g., for daylight harvesting, or it may have other functions integrated such as occupancy sensing, scheduling, etc.

The system of FIG. 11 may be realized in any suitable physical form. For example, the controller 20 may be located in a central electrical room with remote connections to the light sensor 26, input device 32, and lighting load(s) 42. Alternatively, some of the components may be integrated together in a single assembly. For example, the controller 20, light sensor 26 and input device 32 may be integrated into a single housing that may be installed on a light fixture, junction box, wireway, or other suitable location. Such an embodiment may have other lighting control functionality such as occupancy sensing integrated into the assembly. As another alternative, the controller 20 and input device 32 may be integrated into a relay box with a remote connection to the light sensor 26.

The lighting control signal 40 may be a low voltage on/off or dimming control signal that can control one or more loads through a relay, power pack, dimming interface, etc. The lighting control signal 40 may alternatively be high voltage (120 VAC, 277 VAC, etc.) that provides power directly to one or more lighting loads.

Figure 12:
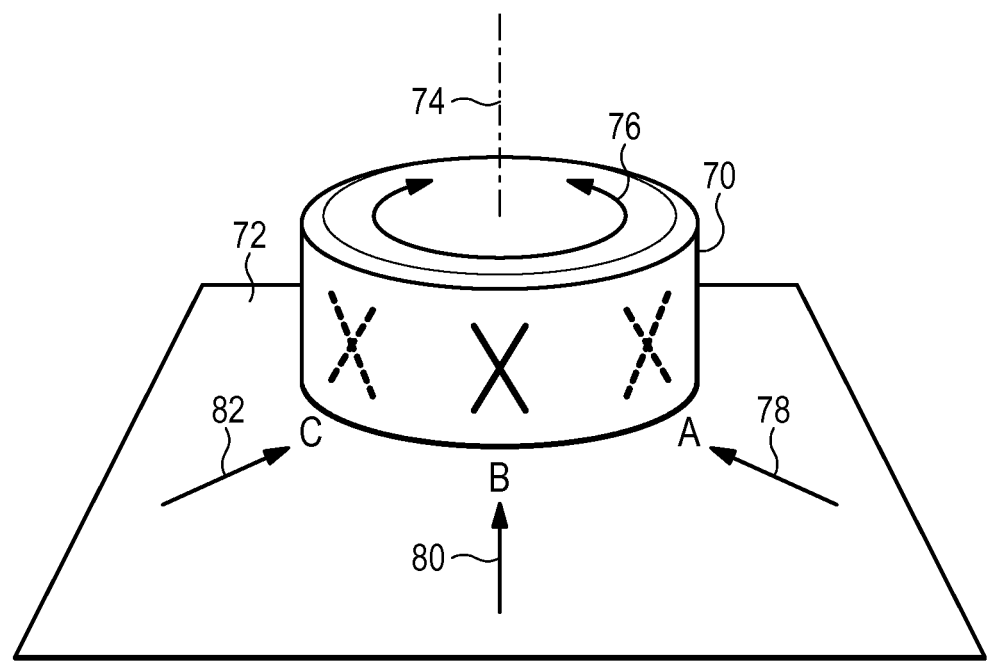
FIG. 12 illustrates an embodiment of a rotating knob for establishing a field of view for a light sensor according to some inventive principles of this patent disclosure.

FIG. 12 illustrates an embodiment of a rotating knob for establishing a field of view for a light sensor according to some inventive principles of this patent disclosure. In the embodiment of FIG. 12, the knob 70 protrudes from a housing 72 and rotates about an axis 74 as shown by arrow 76. The knob is configured to rotate between angular positions and receive light from directions generally perpendicular to the axis 74. The knob receives light at a site marked by a solid X. In the view of FIG. 12, the knob is at an angular position where the X on the knob lines up with the letter B and therefore receives incident light rays 80. The knob may be turned to other angular positions where, for example, the dashed Xs line up with the letters A or C and the knob receives incident light rays 78 or 82, respectively.

A light sensor may be arranged at any location in the system of FIG. 12 that enables it to receive the incident light received by the knob. For example, the light sensor may be mounted to the knob at the location X with a light receiving surface of the sensor pointing outward from the surface of the knob, i.e., a direction normal to the rounded surface of the knob, so the light sensor's field of view points directly at the incoming light rays 78, 80 or 82 when the knob is in position A, B or C, respectively. Alternatively, the knob may include a light pipe that receives the incident light and guides it to a light sensor that may be mounted within the knob, at the surface of the housing 72, or inside the housing 72.

Figure 13:
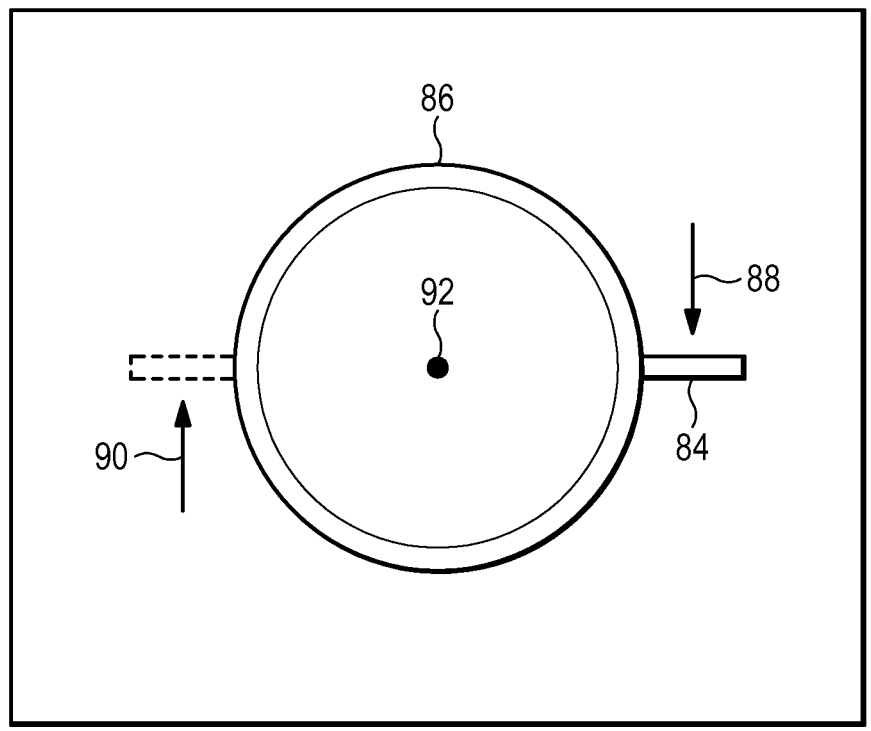
FIG. 13 illustrates another embodiment of a rotating knob for establishing a field of view for a light sensor according to some inventive principles of this patent disclosure.

The light rays 78, 80 and 82 need not be aligned directly with the axis 74 to be considered perpendicular to the axis. For example, FIG. 13 illustrates an embodiment in which a light sensor 84 is mounted to a knob 86 in an orientation that receives light 88 approaching the knob in a direction that is tangent to the rounded surface of the knob. When the knob is rotated to another position where the sensor 84 is shown in dashed outline, the sensor receives light 90 which is traveling in the opposite direction as light rays 88. Thus, it is enough that the knob and sensor are arranged to receive light from different directions in a plane that is generally perpendicular to the axis 92 of the knob as the knob is rotated through different angular positions.

Although the knobs in FIGS. 12 and 13 are shown as cylinders, the knob may take any form suitable for rotating by hand such as the example embodiments described below.

The systems illustrated in FIGS. 12 and 13 may include apparatus to enable the knob to rotate between, and be automatically held in, more than one of the angular positions without using tools. These apparatus may include friction clutches, detents, etc.

Figure 14:
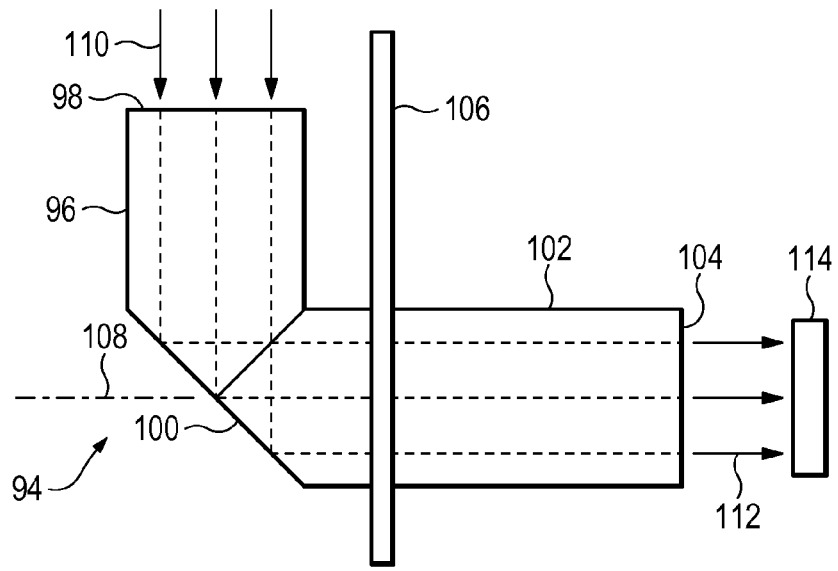
FIG. 14 illustrates an example embodiment of a knob having a light pipe according to some inventive principles of this patent disclosure.

FIG. 14 illustrates an example embodiment of a knob having a light pipe according to some inventive principles of this patent disclosure. The elbow-shaped knob 94 has a receiving tube 96 with an open, light gathering end 98, a reflecting plane 100, and a transmitting tube 102 with a light emitting end 104. The transmitting tube is arranged in a housing 106 to enable the knob to rotate about an axis 108. Incoming light 110 travels through the receiving tube, is redirected at a right angle through the transmitting tube by a reflective surface on the reflecting plane 100, and emerges as incident light 112 which is guided to a light sensor 114 within the housing.

In the view of FIG. 14, the knob is oriented with the open end of the receiving tube pointed upward to capture light traveling in a downward direction, for example, from a skylight or another source of down lighting in the building space. The knob may be rotated 180 degrees about the axis 108 to point downward, for example, to measure task lighting reflected from a work surface. Depending on the implementation, the knob may be also rotated in any other direction in a plane perpendicular to the axis 108. For example, the knob may be rotated 90 degrees so the open end of the receiving tube points into or out of the page as may be useful to measure light from a window.

In some embodiments, the knob may be made from a single piece of plastic or other suitable material with a reflective surface formed on the inside surface of the plane 100. In such an embodiment, the user may rotate the knob by gripping the elbow-shaped portion of the knob protruding from the housing.

Figure 15:
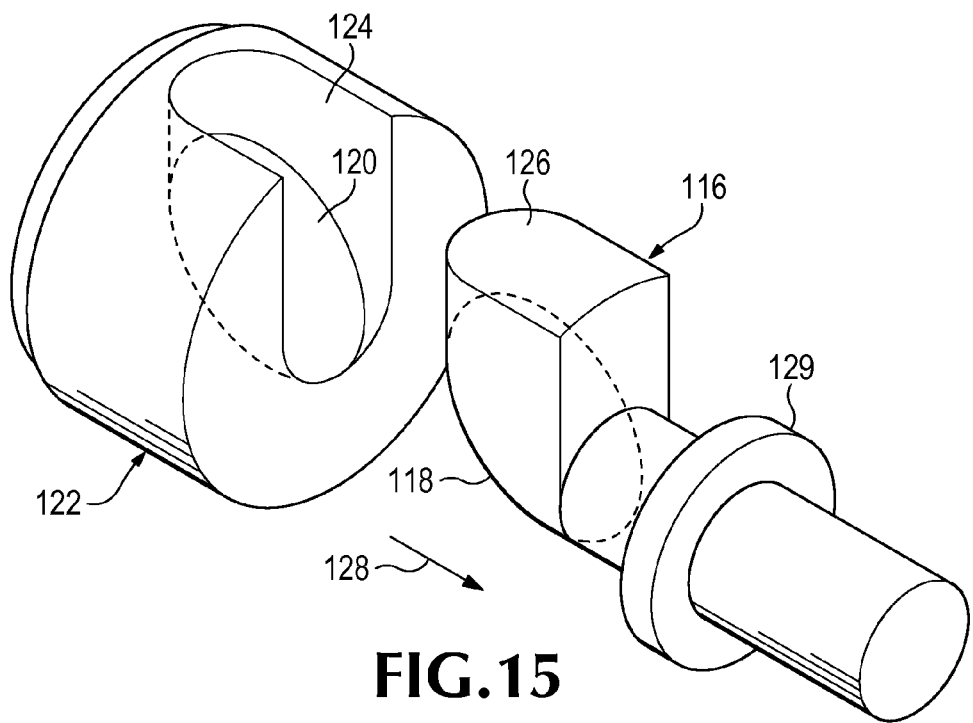
FIG. 15 illustrates another example embodiment of a knob having a light pipe according to some inventive principles of this patent disclosure.

FIG. 15 is an exploded view of another example embodiment of a knob having a light pipe according to some inventive principles of this patent disclosure. The embodiment of FIG. 15 includes an elbow-shaped light pipe 116 similar to the embodiment of FIG. 14. In the embodiment of FIG. 15, however, the light pipe includes an angled cut 118 rather than a solid reflecting plane. The angled cut 118 engages with a reflecting surface 120 on the inside of a cylindrical cap 122 that fits over the external portion of the light pipe. The cap 122 includes an opening 124 for the open, light gathering end 126 of the light pipe 116.

The cap may be designed to press-fit or snap-fit onto the light pipe as shown by arrow 128. The cap may provide an improved grip and/or better aesthetics. It may also be made of an opaque material that may keep light out from all surfaces other than the light gathering end of the light pipe. The reflecting surface 120 may be coated with a highly reflective material such as polished aluminum. A potential advantage of having the reflective surface on the cap is that it may be removed from the light pipe for cleaning.

A disk 129 may be included on the transmitting tube to retain the knob in the housing.

The shapes of the various sections of the light pipe may be varied to provide control over the field of view for the light sensor. One or more lenses may be included at either end of the light pipe or anywhere in between to focus light or control the field of view. The shape or placement of the reflective surface may also be varied to focus or control the field of view. For example, the reflective surface or a lens may be shaped to provide a wide, fisheye field of view, or a narrow, magnified field of view.

FIG. 16 illustrates an example embodiment of a knob for a light level sensor according to some inventive principles of this patent disclosure. In the embodiment of FIG. 16, a light sensor 130 is mounted directly on the side of a knob 132. This placement aligns the light sensor so the radiant sensitive (light receiving) surface of the sensor is most sensitive to light rays 134 that are generally perpendicular to the rotational axis 136 of the knob at any given rotational position.

The knob 132 includes a body 138 having an exterior portion 140 that is generally cylindrical. A flat portion 142 defines an opening that essentially cuts through the cylinder of the knob body along a plane that is parallel to the rotational axis 136. The light sensor 130 is mounted on a circuit board 146 which fits into the opening and rests against a bottom surface 143 of a well in the knob body.

A clear cover 148 covers the circuit board and light sensor and rests on a recessed ledge 144 on three sides of the opening. The clear cover 148 includes a rim 150 to position the cover over the circuit board. Two alignment holes 152 in the clear cover engage with alignment posts 154 on the knob body and hold the clear cover in place through heat staking, adhesive, or any other suitable technique.

Wire leads 156 are soldered to the circuit board and provide a flexible electrical connection between the light sensor on the board and a lighting control circuit as the knob rotates about the axis 136. The wire leads are routed through a slot 158 and attached to a connector 160 to provide a removable connection to the control circuit.

A ridge 162 on the face of the knob body indicates the rotational position of the knob and light sensor.

FIG. 17 is a top plan view of the knob body 138. This view shows the slot 158 for the wire leads more completely. A disk 164 may engage a corresponding slot in a housing to retain the knob in the housing. A tab 166 may be arranged to engage one or more corresponding stops in the housing to limit the rotational range of the knob to 180 degrees or any other suitable range. Any suitable shaft surface 168 of the knob may be used to engage a friction pad, clutch or any other suitable apparatus to provide a consistent feel to the knob rotation and to maintain the knob in any rotational position selected by the user. Alternatively, a detent wheel or any other suitable apparatus may be used to maintain the knob in any number of discrete positions.

Placing the light sensor directly on the knob may improve the effectiveness of the sensor by reducing transmission losses that may occur in a light pipe, and thus, increasing the amount of light captured by the sensor.

Figure 18:
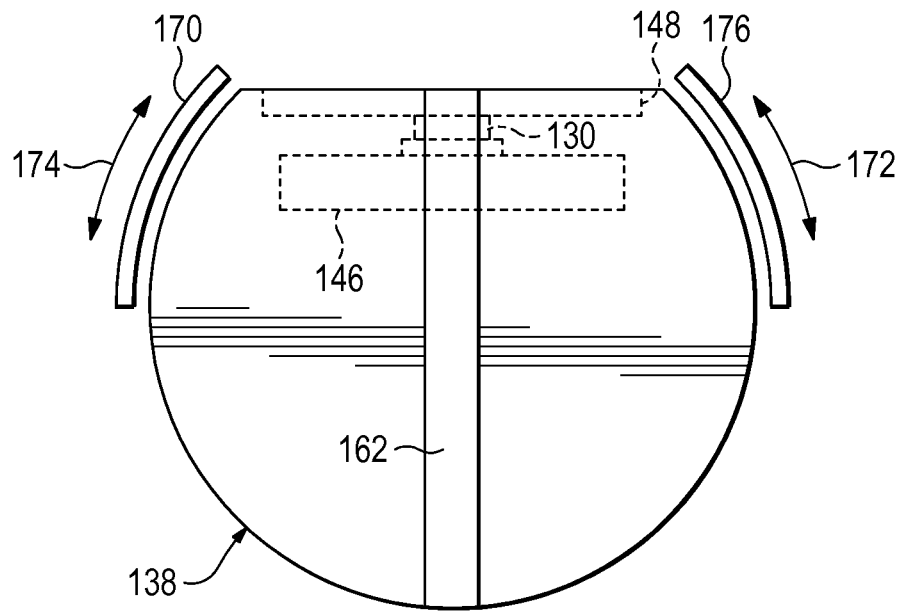
FIG. 18 illustrates an embodiment of shutters for a knob for a light level sensor according to some inventive principles of this patent disclosure.

The clear cover 148 may be implemented as a simple, flat sheet that provides little or no optical properties. Alternatively, a lens 151 may be molded into, or attached to, the cover to provide selective shaping of the viewing angle/pattern for the light sensor. A system of shutters, mirrors and/or guides may be used to control the viewing angle/pattern. FIG. 18 illustrates a conceptual view of shutters 170 and 172 which may be moved circumferentially as shown by arrows 174 and 176, respectively, to limit the field of view of the light sensor 130. The shutters 170 and 172 may be added on to, or made integral with, the knob body 138.

Figure 19:
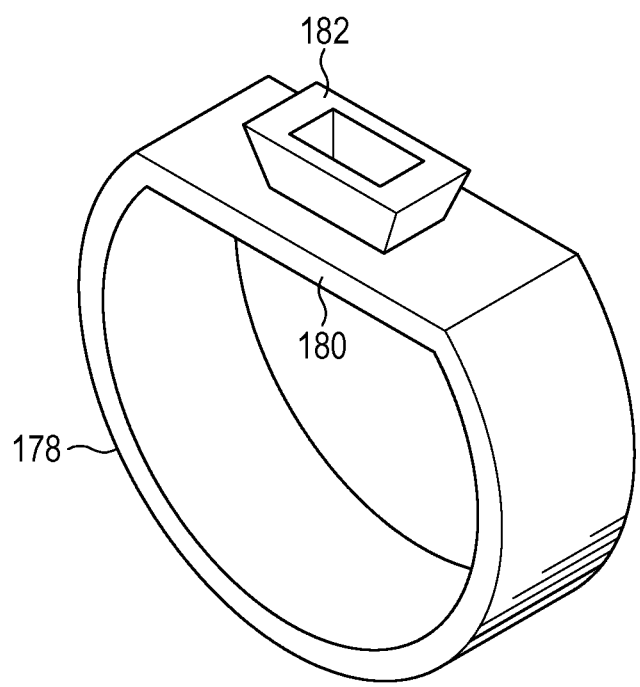
FIG. 19 illustrates another system for shaping a viewing angle/pattern for a light sensor knob according to some inventive principles of this patent disclosure.

FIG. 19 illustrates another system for shaping of the viewing angle/pattern for the light sensor. A ring 178 is sized to slip snugly over the knob body. A flat portion 180 of the ring indexes the ring to the corresponding flat portion 142 of the knob body 138. A light guide 182 of any suitable size and shape enables the viewing angle/pattern of the light sensor to be adjusted by slipping the ring over the knob body. Different rings having a variety of different light guides may be provided with the knob or as an accessory kit to enable an installer to adjust the field of view of the light sensor.

The inventive principles relating to the use of a rotating knob for establishing a field of view for a light sensor are not limited to use with light sensors for lighting level control. For example, the inventive principles may be applied to occupancy sensors such as passive infrared (PIR) sensors to provide an easily adjustable field of view.

Figure 20:
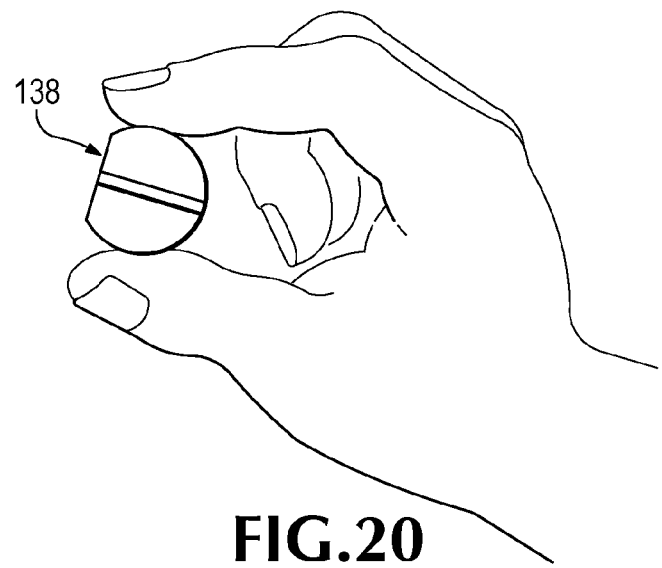
FIG. 20 illustrates an embodiment of a knob for a light level sensor according to some inventive principles of this patent disclosure.

Although the inventive principles are not limited to any specific knob sizes, in some embodiments, a rotating knob according to the inventive principles of this patent disclosure may be sized to occupy a small amount of space while still providing an adequate gripping surface. An example is shown in FIG. 20, where the knob body 138 is sized so that a user with average size adult hands may comfortably grip the knob between the pads of a thumb and index finger on one hand. In some other embodiments, the knob may be somewhat larger so a user with average size adult hands may comfortably grip the knob between the pads of a thumb and two fingers, or between a thumb and the side of an index finger on one hand.

The inventive principles relating to setpoint knobs, light sensor knobs and other inventive principles of this patent disclosure have independent utility and are not limited to any particular implementation details or systems. Some of these inventive principles, however, may be combined to create embodiments having synergistic results.

Figure 21:
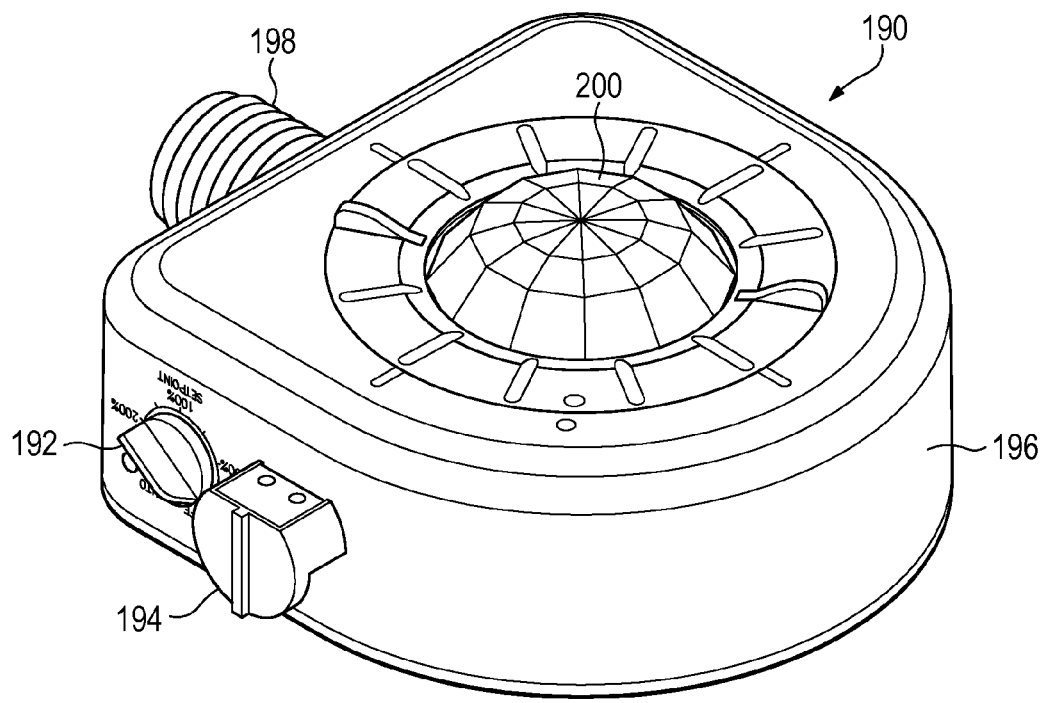
FIG. 21 illustrates an embodiment of a combined occupancy/light sensor having a setpoint knob and light sensor knob according to some inventive principles of this patent disclosure.

For example, FIG. 21 illustrates an embodiment of a combined occupancy/light sensor 190 having a setpoint knob 192 and light sensor knob 194 according to some inventive principles of this patent disclosure. The sensor 190 has a housing 196 with a fitting 198 that enables the housing to be installed directly to a light fixture or electrical box through a standard ½ inch knockout. The bottom of the housing in the embodiment of FIG. 21 includes a lens 200 for a passive infrared (PIR) occupancy sensing circuit, but any suitable occupancy sensing technology may be used. The setpoint knob 192 and light sensor knob 194 are located on the side of the housing visible in this view. The housing includes SET/OFF and AUTO LEDs and calibrated markings for the setpoint knob as described above with respect to FIGS. 1 through 7. The other side of the housing may include time delay and/or sensitivity knobs for the PIR sensor.

A lighting control circuit located within the housing may include circuitry to operate the occupancy sensor, light sensor, input knobs, etc., and provide outputs in the form of low voltage signaling, network communications, line voltage switching of lighting loads, etc. The PIR or other occupancy sensing detector may be implemented with replaceable lenses or other guides to enable adjustment of the field of view.

Combining some or all of these features in a single control device may enable the installation of a complete occupancy based lighting control system with ambient light hold off (or dimming type daylight harvesting) that is flexible, versatile, robust, and/or inexpensive both in terms of component cost and installation time. Both the occupancy sensing and the daylight harvesting functionality may be realized in a single compact package that may still allow independent adjustment of the occupancy sensing and light sensing features.

Figure 22:
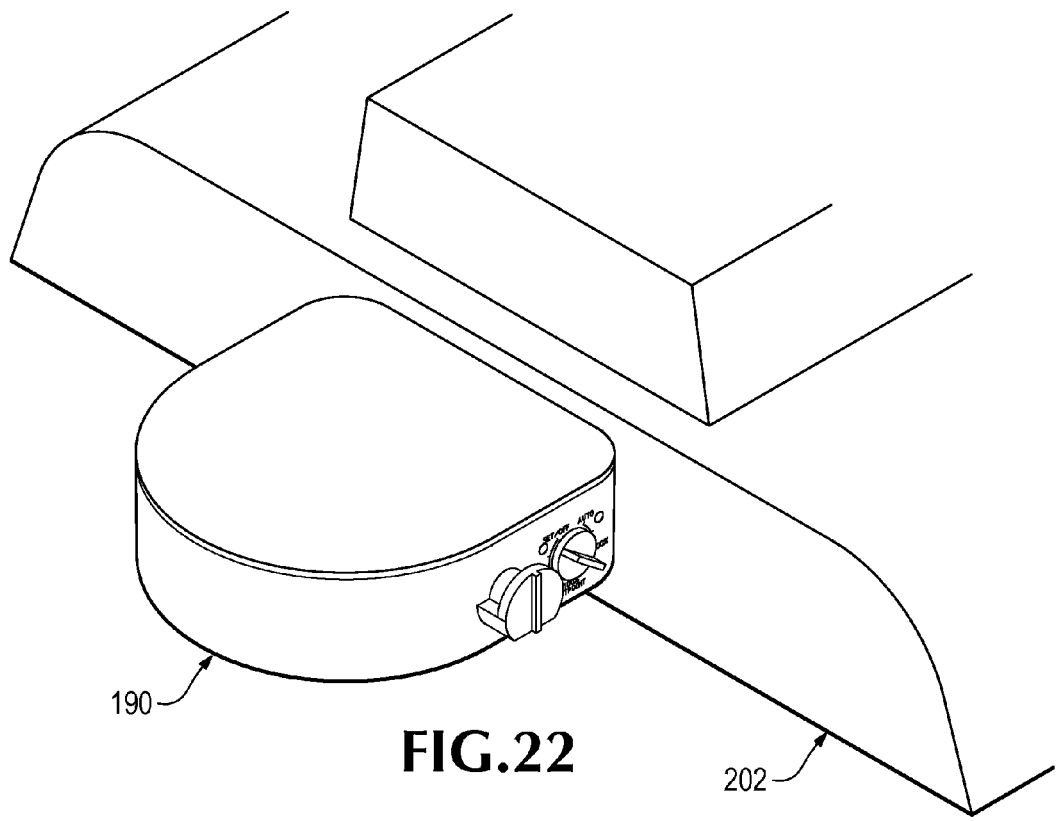
FIG. 22 illustrates an example installation of an occupancy/light sensor according to some inventive principles of this patent disclosure.

FIG. 22 illustrates an example installation of the embodiment of FIG. 21 according to some inventive principles of this patent disclosure. The housing is installed on a fluorescent light fixture 202 with the PIR lens pointing downward at the building space served by the fixture. If the system is to be configured for open-loop operation, the installer may rotate the light sensor knob 194 to point upward at a skylight or other source of ambient down lighting. Alternatively, the installer may rotate the dial to point horizontally at a window. The installer may then turn the setpoint dial to the SET/OFF position to initiate a manual calibration process. If the ambient light is the same as the design level, the installer may then complete the calibration process by turning the setpoint dial to the 100% position. Otherwise, the installer may turn the setpoint dial to an appropriate percentage position as described above to complete the calibration process.

The system may be conveniently reconfigured at any time. For example, if the open-loop operation fails to perform satisfactorily, or if the lighting demands of the building space change, the system may be reconfigured for closed loop operation. To begin the conversion, the installer may rotate the light sensor dial to point downward to measure task lighting reflected from a work surface. The setpoint dial may then be rotated to the AUTO position to begin an automatic calibration process such as the 24 hour process described above. At the end of the automatic calibration process, the setpoint dial may be left in the AUTO position, which may typically provide satisfactory results, or the setpoint dial may be rotated to a suitable percentage position to adjust the light level setpoint.

Alternatively, the system may be reconfigured by switching from closed-loop to open-loop operation. Thus, the embodiment of FIG. 21 may provide a reliable system that is easy to troubleshoot, adjust, and/or modify to adapt to various operating conditions.

Figure 23:
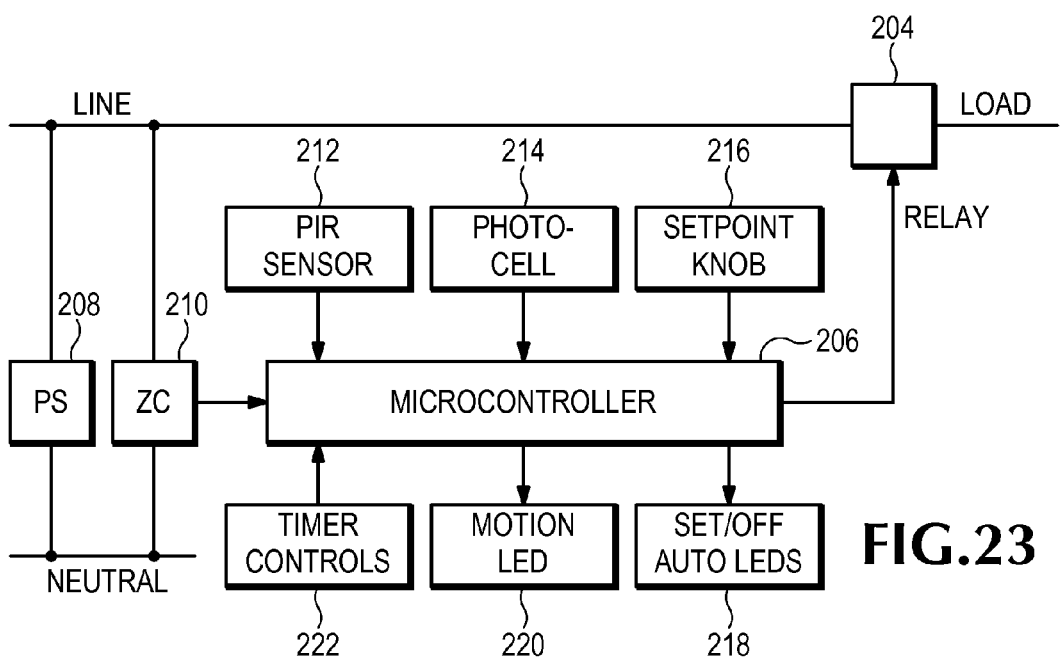
FIG. 23 illustrates an embodiment of a control circuit according to some inventive principles of this patent disclosure.

FIG. 23 illustrates an embodiment of a control circuit for use with the combined occupancy sensor and light level sensor of FIG. 21. AC power is applied to the circuit through LINE and NEUTRAL connections. A relay 204 applies power to a LOAD connection in response to a RELAY signal from a microcontroller 206. A low voltage power supply 208 converts the AC line voltage to a DC voltage suitable for operating the microcontroller and other electronics in the control circuit. A zero crossing detector 210 enables the microcontroller to synchronize the relay switching with the line voltage waveform to extend relay life.

Although the embodiment of FIG. 23 includes an on-off relay, any suitable form of power switching may be utilized including power switching in discrete steps with intermediate steps, or continuous switching such as dimming control. If dimming control is used, the RELAY output from the microprocessor may be in the form of dimming control signal such as a 0-10VDC output for a ballast or other lighting load, a Digital Addressable Lighting Interface (DALI) signal, etc.

A PIR detector circuit 212 and photocell circuit 214 may provide analog inputs to the microcontroller. For example, in some embodiments, an Osram SFH5711 ambient light sensing integrated circuit (IC) may be used for the light sensor. To accommodate the logarithmic current mode output of the IC, the photocell circuit 214 may include a resistor to convert the output current to a voltage. The photocell circuit 214 may also include a low-pass active filter with a corner frequency low enough to eliminate 100 Hz or 120 Hz flicker that is inherent in incandescent lighting. The filter may be implemented, for example, with a simple 2-pole op amp filter with a corner frequency of about 16 Hz. The output from the filter may then be used to drive an analog-to-digital (A/D) converter on the microcontroller, which may implement all of the control functionality with firmware. The A/D conversion may be implemented ratiometrically by using the DC power supply for the light sensing IC as the reference for the A/D converter.

If the setpoint knob is implemented with a potentiometer, the lighting setpoint circuit 216 may be realized by simply applying the A/D reference voltage across the potentiometer, and reading the wiper voltage with another A/D input on the microcontroller. If the setpoint knob is implemented with an encoder or other position sensing technique, the lighting setpoint circuit 216 may include suitable decoding circuitry or other support circuitry to convert the knob position to an analog or digital form usable by the microcontroller.

The SET/OFF and AUTO LEDs may be driven through current limiting resistors connected to digital outputs on the microcontroller or any other suitable drive circuitry 218. An indicator LED for the PIR or other occupancy sensor may also be driven by the same type of drive circuitry 220. Time delay and/or sensitivity controls 222 for the PIR or other occupancy sensor may be implemented with any suitable input circuitry.

The embodiment of FIG. 23 provides AC switching functionality, but other embodiments may implement LV signaling to enable a power pack, relay panel or other switching device to handle the actual power switching. Still other embodiments may include a network interface to communicate with other lighting control equipment through any suitable control network.

Some additional inventive principles of this patent disclosure relate to methods and apparatus for providing failsafe operation for lighting control systems having processors with certain failure modes. Lighting control devices such as occupancy sensors and light level controls often have control circuits based on microcontrollers, which are essentially microprocessors with all support circuitry integrated on one IC. Although microcontrollers have achieved high levels of reliability, they are still susceptible to occasional failures caused by electrostatic discharge (ESD), power supply failures, code glitches, etc. Failure of a lighting control device may cause a loss of lighting which may be especially problematic in locations like parking lots and stairwells. Microcontrollers often utilize watchdog circuits to reset the processor if a code glitch causes the processor to malfunction, but these circuits do not protect against other failure modes.

Moreover, even if a watchdog circuit enables a processor to recover by initiating a reset, there is typically a delay during the reset process during which lighting may be lost.

According to some inventive principles of this patent disclosure, a processor that controls a lighting load is monitored by a failsafe circuit. If the failsafe circuit determines that the processor has failed, the failsafe circuit turns on the lighting load. The failsafe circuit may turn on the lighting load regardless of any inputs the processor may have been monitoring. These inventive principles may be realized in countless different embodiments, some of which are described below.

Figure 24:
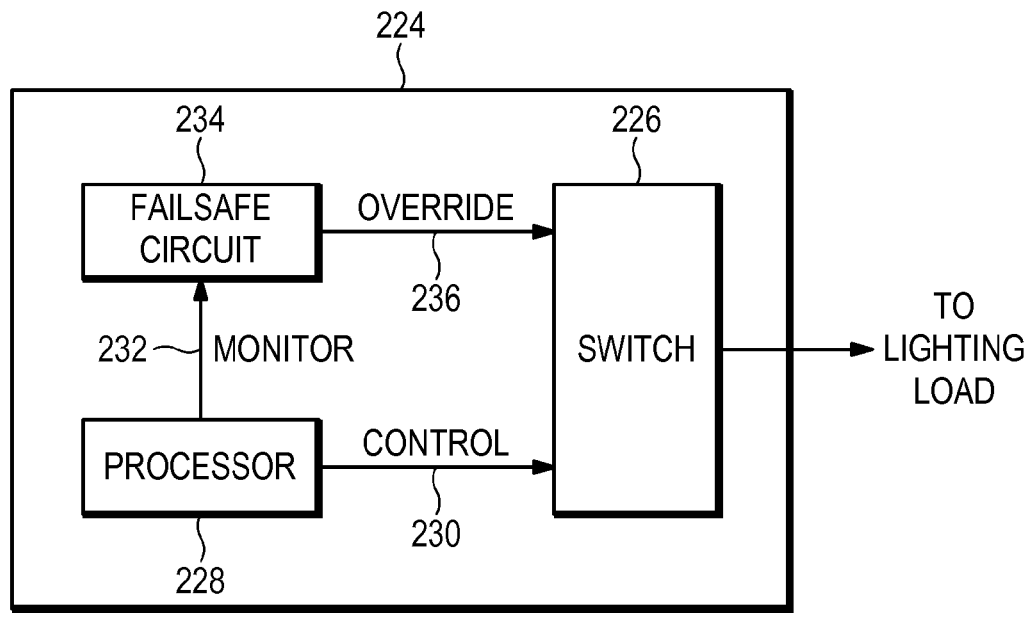
FIG. 24 illustrates an embodiment of a lighting control device having a failsafe circuit according to some inventive principles of this patent disclosure.

FIG. 24 illustrates an embodiment of a lighting control device 224 having a failsafe circuit according to some inventive principles of this patent disclosure. The embodiment of FIG. 24 includes a switch 226 arranged to control power to a lighting load. The switch 226 is controlled by a control signal 230 generated by a processor-based control circuit 228. The processor in the control circuit generates a monitor signal 232 that may be used to determine if the processor has failed. A failsafe circuit 234 continuously monitors the monitor signal 232 to assure that the processor is operating correctly. If the failsafe circuit determines that the processor has failed, the failsafe circuit asserts an override signal 236 that forces the switch 226 to turn on the lighting load.

The switch 226 may include any suitable form of isolated or non-isolated power switches including air-gap relays, solid state relays, or other switches based on SCRs, Triacs, transistors, etc. The switch may provide power switching in discrete steps such as off/on switching, with or without intermediate steps, or continuous switching such as dimming control. The power connections to the switch may include a common neutral terminal with two switched hot terminals, an isolated pair of terminals, or any other suitable configuration.

The processor in the control circuit 228 may include a microprocessor, microcontroller, gate array, or any other analog or digital signal processing circuitry that is susceptible to failures of the types encountered with microprocessor and microcontrollers such as those caused by ESD, power supply failures, programming glitches, etc. Thus, the control circuit may be realized with analog or digital hardware, software, firmware, or any suitable combination thereof.

The monitor signal 232 may take any form suitable to enable the failsafe circuit to determine if the processor is operating properly. For example, the monitor signal may be implemented as a digital signal with periodic pulses generated through periodic action by the processor which may prove that the processor is functioning properly. Other examples include digital data streams with constantly changing code words encoded in the stream, and analog waveforms that require continuous periodic action by the processor to generate.

The failsafe circuit 234 may be implemented in any suitable form to reliably monitor the monitor signal 232 and override the switch in response to a failure of the processor. The failsafe circuit may be realized with analog or digital hardware, software, firmware, or any suitable combination thereof. However, it may be beneficial for reliability reasons for the circuit to be implemented in a simple form with good immunity to noise and other circuit disturbances.

The control device 224 of FIG. 24 may be realized in any suitable physical form. For example, the device 224 may be an occupancy sensor, a light level control, a combined occupancy sensor and light level control such as the embodiment described above with respect to FIGS. 21-23, a power pack, a relay module, a relay bus card for a relay cabinet, or any other lighting control device that includes a switch for controlling a lighting load.

Figure 25:
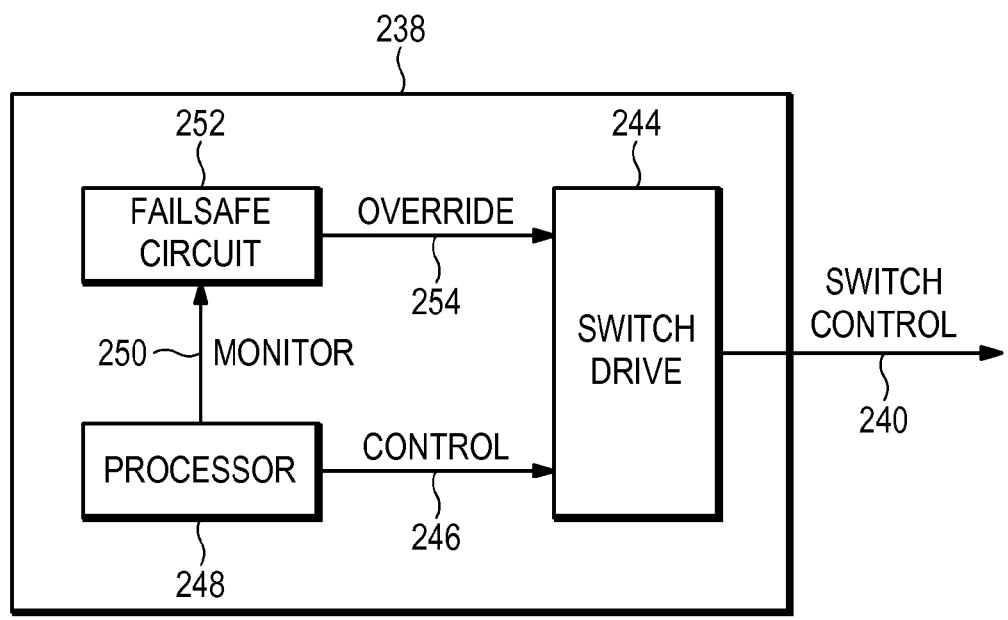
FIG. 25 illustrates another embodiment of a lighting control device according to some inventive principles of this patent disclosure.

The inventive principles relating to failsafe circuits may also be applied to lighting control devices that do not have integral power switches. FIG. 25 illustrates an embodiment of a lighting control device 238 that provides a switch control signal 240 that is used by other switching equipment. A switch drive circuit 244 generates the switch control signal 240 in response to a control signal 246 generated by a processor-based control circuit 248. The processor in the control circuit generates a monitor signal 250 that may be used to determine if the processor has failed. A failsafe circuit 252 continuously monitors the monitor signal 250 to assure that the processor is operating correctly. If the failsafe circuit determines that the processor has failed, the failsafe circuit asserts an override signal 254 that forces the switch drive circuit 244 to assert the switch control signal 240 in a manner that turns on the lighting load associated with the lighting control device 238.

The switch control signal 240 may be realized in any suitable hard wired or wireless form to control an associated lighting load. For example, the switch control signal 240 may be implemented as a 24 VDC signal that may be used by a power pack, relay module, etc. to switch a lighting load. As another example, the switch control signal 240 may be implemented as a digital control signal such as those used by the digital addressable lighting interface (DALI) standard, or any other standard or proprietary interface such as control area network (CAN), SectorNet™, LonWorks, etc. As some additional examples, the switch control signal 240 may be implemented as a 0-10 volt analog dimming interface, an X-10 power line communication interface, a Z-Wave wireless interface, etc.

The processor-based control circuit 248, monitor signal 250 and failsafe circuit 252 may be implemented in any suitable form as discussed above with respect to the embodiment of FIG. 24.

The control device 238 of FIG. 25 may be realized in any suitable physical form. For example, the device 238 may be a hard-wired or wireless occupancy sensor, light level control, combined occupancy sensor and light level control, a low-voltage wall switch, a digital wall switch, a wireless wall switch, etc.

Figure 26:
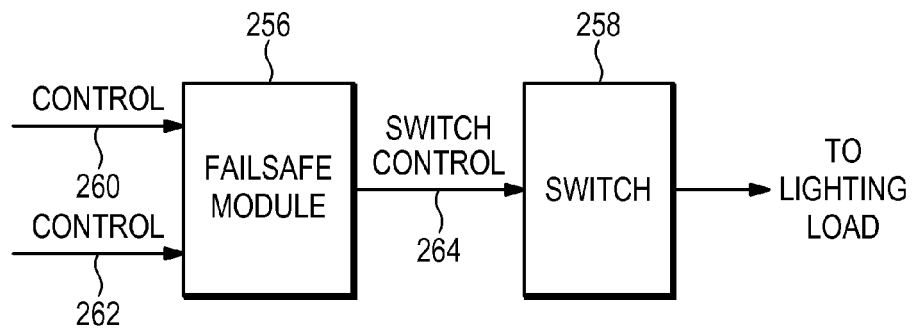
FIG. 26 illustrates an embodiment of a lighting control system in which a failsafe circuit is realized as part of a failsafe module according to some inventive principles of this patent disclosure.

A failsafe circuit may also be implemented separately from any of the other components. For example, FIG. 26 illustrates an embodiment of a lighting control system in which a failsafe circuit is realized as part of a failsafe module 256 that is separate from both the processor it monitors and the associated lighting control switch 258. In this configuration, the failsafe module has a first input to receive a control signal 260 from a processor-based control circuit, and a second input to receive a monitor signal 262 from the same control circuit. As long as the monitor signal 262 indicates that the processor has not failed, the failsafe module 256 simply relays the state of the control signal 260 to the switch 258 as the switch control signal 264. If however, the monitor signal indicates that the processor has failed, the failsafe module 256 forces the switch control signal 264 to a state that turns on the lighting load controlled by the switch 258.

An advantage of the embodiment of FIG. 26 is that it may enable the failsafe module to operate from a power supply that is separate from the processor-based control circuit, thereby enabling the module to provide failsafe operation to a wider range of failure modes.

The circuitry in the failsafe module 256 may be implemented in any suitable manner as described above with respect to the failsafe circuit 252 and switch drive circuit 244 of the embodiment of FIG. 25.

Alternatively, the failsafe circuit or module may be made integral with the switch 258, for example, by including a failsafe circuit in a power pack, relay module, etc.

Figure 27:
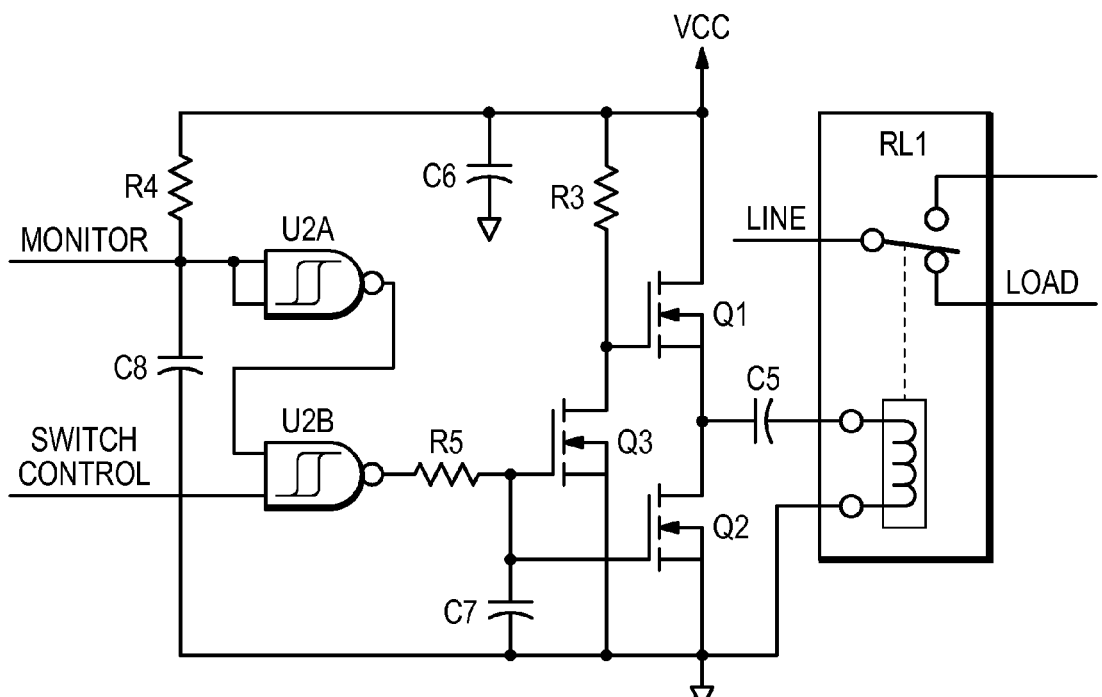
FIG. 27 illustrates an example embodiment of a failsafe circuit according to some inventive principles of this patent disclosure.

FIG. 27 is a schematic of an example embodiment of a failsafe circuit according to some inventive principles of this patent disclosure. The circuitry to the right of resistor R5 is similar to a conventional relay driver for an occupancy sensor. Rather than applying the switch control signal to R5, however, the embodiment of FIG. 27 includes a pair of Schmitt trigger input NAND gates U2A and U2B arranged to force the load to the on state if the failsafe circuit stops receiving a periodic monitor signal from a processor. Resistor R4 and capacitor C8 form a time constant that may be reset by temporarily pulling the MONITOR input to ground, thereby discharging C8. This may be accomplished, for example, by using an open drain digital output from the processor, or by arranging a transistor to pull the MONITOR input to ground in response to any suitable digital output from the processor, or in any other suitable manner.

When the MONITOR input is released by the pull-down apparatus, capacitor C8 begins to charge with an RC time constant determined by the values of R4 and C8. If another reset pulse is applied to the MONITOR input before the voltage on C8 reaches the switching point of U2A, The output of U2A remains high, and the failsafe circuit continues to operate normally with the switch control input being transmitted through U2B to provide normal control of the relay RL1. If, however, another reset pulse dues not occur on the MONITOR input during a time period that is longer than the RC time constant of R4 and C8, which may indicate that the processor has failed, the output of U2A goes low, thereby forcing the output of U2B high and energizing the load controlled by relay RL1.

The use of a Schmitt trigger input may prevent oscillations that may occur around the switching point of the gate U2A if the time constant is set to a relatively long period that causes the voltage on C8 to ramp slowly. The time constant may be set, for example, to about 2 seconds to prevent nuisance tripping while limiting any potential "dark" periods caused by a processor failure to an acceptably short time.

Figure 28:
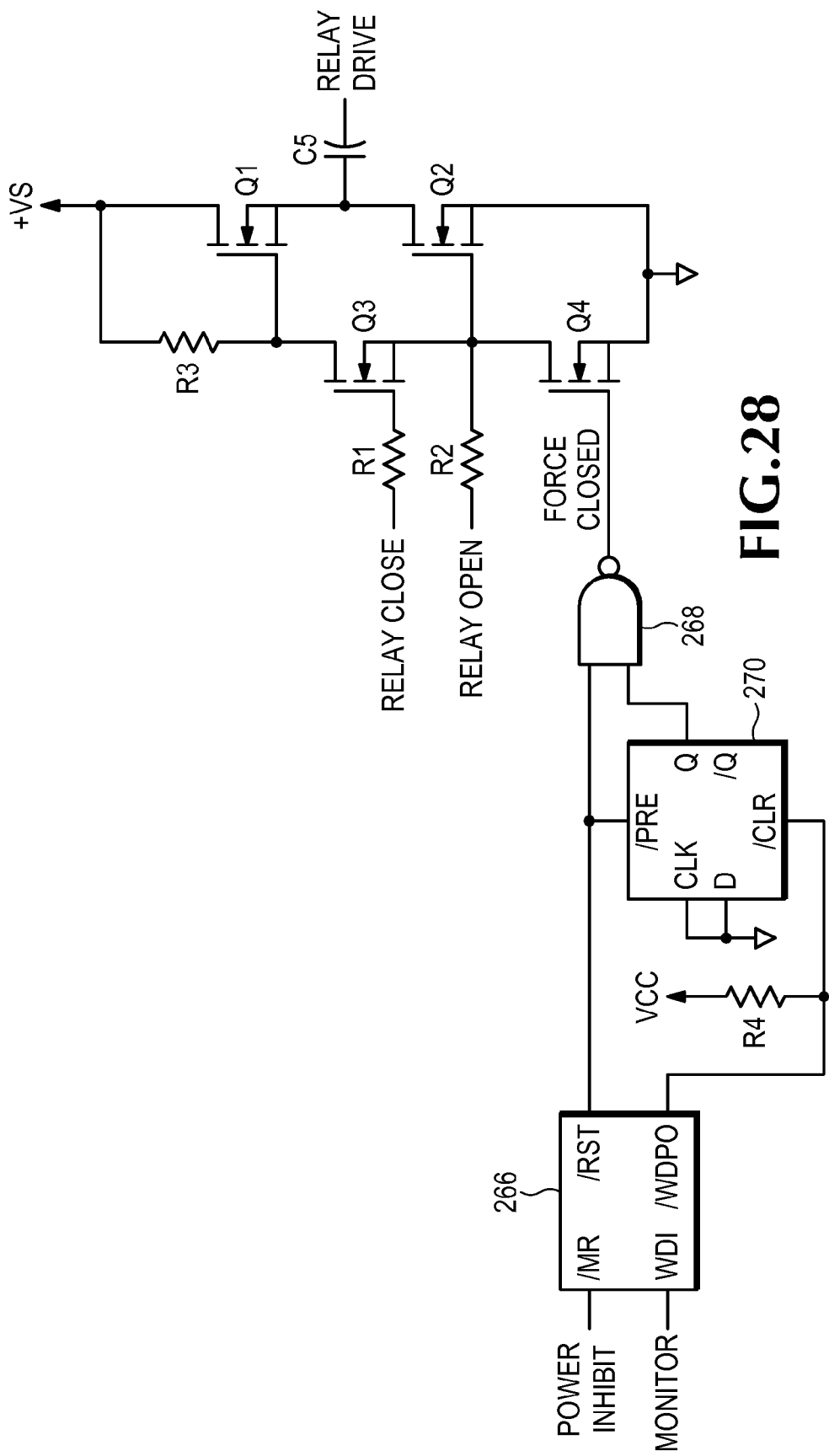
FIG. 28 is a schematic of another example embodiment of a failsafe circuit according to some inventive principles of this patent disclosure.

FIG. 28 is a schematic of another example embodiment of a failsafe circuit according to some inventive principles of this patent disclosure. The embodiment of FIG. 28 includes transistors Q1-Q3, resistor R3 and capacitor C5 arranged in a manner similar to the embodiment of FIG. 27, but in the embodiment of FIG. 28, the gates of Q2 and Q3 are brought out to terminals RELAY CLOSE and RELAY OPEN which are driven separately by the microcontroller or other control circuit. A fourth transistor Q4 is arranged to force the relay to the open state in response to a FORCE CLOSED signal from NAND gate 268. One input of the NAND gate is driven by the Q output of a D-type positive edge triggered flip-flop 270. The other input of the NAND gate is driven by the reset output/RST of a watchdog timeout circuit 266. The/RST output also drives a preset input/PRE of the flip-flop 270.

The watchdog timeout circuit 266 generates watchdog pulse output signal /WDPO that is driven low for 1 ms if the watchdog input WDI does not receive a continuous stream of pulses at the proper time intervals on the MONITOR signal from the microcontroller or other control circuit. The reset output/RST is driven low in response to a POWER INHIBIT signal from the microcontroller or other control circuit. An example of a suitable watchdog timeout circuit 266 is the MAX6323.

The inventive principles of this patent disclosure have been described above with reference to some specific example embodiments, but these embodiments can be modified in arrangement and detail without departing from the inventive concepts. Such changes and modifications are considered to fall within the scope of the following claims.

The invention claimed is:

1. A system comprising:
   a light sensor;
   an actuator having a range of motion; and
   a circuit adapted to establish a light level setpoint in response to the light sensor and the actuator;
   where the circuit is adapted to perform a first function when the actuator is in a first region of the range of motion and a second function when the actuator is in a second region of the range of motion.

2. The system of claim 1 where:
   the first function comprises setting the light level setpoint; and
   the second function comprises adjusting the light level setpoint.

3. The system of claim 2 where setting the light level setpoint comprises setting the light level setpoint manually.

4. The system of claim 2 where setting the light level setpoint comprises setting the light level setpoint automatically.

5. The system of claim 1 where the first function comprises disabling the light level setpoint.

6. The system of claim 1 where the circuit is adapted to perform a third function when the actuator is in the second region.

7. The system of claim 6 where the circuit is adapted to select the second function or the third function in response to the amount of time the actuator is in the second region.

8. The system of claim 7 where:
   the second function comprises setting the light level setpoint; and
   the third function comprises disabling the light level setpoint.

9. The system of claim 2 where the second region includes two or more subregions.

10. The system of claim 2 where one of the subregions includes a neutral position.

11. The system of claim 10 where the circuit is adapted to not adjust the setpoint if the actuator is moved to the neutral position.

12. The system of claim 11 where the circuit is adapted to adjust the setpoint by a calibrated amount based on the position of the actuator in a second one of the subregions.

13. The system of claim 12 where the circuit is adapted to adjust the setpoint by a calibrated percentage based on the position of the actuator.

14. The system of claim 1 where the light sensor, the actuator and the circuit are arranged in an assembly.

15. The system of claim 14 where the assembly comprises a light level controller.

16. The system of claim 1 where the actuator and the circuit are arranged in an assembly.

17. The system of claim 16 where the assembly comprises a relay box.

18. The system of claim 1:
   further comprising a potentiometer;
   where the actuator is arranged to control a wiper on the potentiometer; and
   where the circuit is arranged to read the position of the actuator by reading the voltage of the wiper.

19. The system of claim 1 further comprising calibrated markings arranged to indicate the position of the actuator in the second region.

20. A method comprising:
   obtaining a light level measurement for a space;
   reading the position of an actuator having a range of motion;
   establishing a light level setpoint in response to the light level measurement when the actuator is in a first region of the range of motion; and
   adjusting the light level setpoint in response to the position of the actuator when the actuator is in a second region of the range of motion.

21. The method of claim 20 where adjusting the light level setpoint comprises adjusting the light level setpoint by a calibrated amount based on the position of the actuator in the second region.

22. The method of claim 21 where the calibrated amount comprises a calibrated percentage of the light level setpoint.

23. The method of claim 20 where obtaining the light level measurement consists essentially of measuring light entering the space from outside the space.

24. The method of claim 20 where obtaining the light level measurement comprises measuring light reflected from inside the space.

25. The method of claim 20 where establishing the light level setpoint comprises establishing the light level setpoint manually.

26. The method of claim 20 where establishing the light level setpoint comprises establishing the light level setpoint automatically.

27. The method of claim 26 further comprising establishing the light level setpoint manually in response to the light level measurement when the actuator is in a third region of the range of motion.

28. The method of claim 20 further comprising disabling the light level setpoint when the actuator is in a third region of the range of motion.

29. A lighting controller comprising:
   an input to receive a light level signal from a light sensor;
   an input to receive an actuator signal from an actuator having a range of motion; and
   a circuit adapted to establish a light level setpoint in response to the light level signal and the actuator signal;
   where the circuit is adapted to perform a first function when the actuator is in a first region of the range of motion and a second function when the actuator is in a second region of the range of motion.

30. The lighting controller of claim 29 further comprising an indicator adapted to indicate the first function.

31. The lighting controller of claim 29 where the circuit is adapted to perform the first function when the actuator has been in the first region for a first period of time.

32. The lighting controller of claim 29 where the circuit is adapted to perform a third function when the actuator is in a third region of the range of motion.

33. The lighting controller of claim 32 where:
   the first function comprises setting the light level setpoint manually;
   the second function comprises adjusting the light level setpoint; and
   the third function comprises setting the light level setpoint automatically.

34. The lighting controller of claim 33 where:
   the second region includes a neutral position; and
   the circuit is adapted to not adjust the light level setpoint when the actuator is in the neutral position.

35. The lighting controller of claim 34 where the circuit is adapted to adjust the light level setpoint by a calibrated percentage when the actuator is in the second region, but not in the neutral position.

36. The lighting controller of claim 33 where the circuit is adapted to:
   begin setting the light level setpoint manually when the actuator is moved into the first region; and
   use the light level measured from the light sensor as the setpoint when the actuator is moved out of the first region.

37. The lighting controller of claim 36 where the circuit is adapted to:
   begin setting the light level setpoint automatically when the actuator is moved into the third region.

38. The lighting controller of claim 37 where the circuit is adapted to adjust the setpoint by a calibrated amount based on the position of the actuator when the actuator is moved into the second region.

39. The lighting controller of claim 38 where the circuit is adapted to use the light level measured from the light sensor as the setpoint if the actuator is moved out of the third region before the light level setpoint has finished being set automatically.

* * * * *